US 6,706,356 B2

(12) United States Patent
Lee

(10) Patent No.: US 6,706,356 B2
(45) Date of Patent: Mar. 16, 2004

(54) HIGH SOLIDS CONTENT, LOW-VISCOSITY EMULSION POLYMERS

(75) Inventor: Ivan Lee, Arcadia, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 10/264,453

(22) Filed: Oct. 4, 2002

(65) Prior Publication Data

US 2003/0091778 A1 May 15, 2003

Related U.S. Application Data

(60) Provisional application No. 60/327,238, filed on Oct. 5, 2001.

(51) Int. Cl.[7] .................................................. C09J 7/02
(52) U.S. Cl. .................... 428/40.1; 428/40.2; 428/41.3; 428/41.5; 428/341; 428/355; 523/200; 523/331; 524/460; 524/356; 524/558; 524/560; 525/242; 525/301; 526/264; 526/317.1; 526/319
(58) Field of Search ................ 428/40.1, 40.2, 428/41.3, 41.5, 355, 341; 525/301, 242; 523/200, 331; 524/460, 560, 556, 558; 526/264, 317.1, 319

(56) References Cited

U.S. PATENT DOCUMENTS

| 4,510,197 A | | 4/1985 | Shah |
| 4,657,966 A | | 4/1987 | Mallya |
| 5,240,989 A | | 8/1993 | Bernard et al. |
| 5,895,801 A | * | 4/1999 | Lee ............................ 525/301 |

FOREIGN PATENT DOCUMENTS

| WO | WO 91/04151 | 4/1991 |

* cited by examiner

Primary Examiner—Nasser Ahmad
(74) Attorney, Agent, or Firm—Christie, Parker & Hale, LLP

(57) ABSTRACT

Emulsion polymers useful in the preparation of coatings and adhesives, including PSA tapes, labels, and other constructions, are provided. The polymers are characterized by high solids content and low viscosity. A method of making the polymers is also provided. A plurality of acrylic monomers are copolymerized in the presence of a plurality of surfactants, using a split feed, and the resulting emulsion polymers have a bimodal or higher particle-size distribution.

39 Claims, No Drawings

HIGH SOLIDS CONTENT, LOW-VISCOSITY EMULSION POLYMERS

CROSS-REFERENCE TO RELATED APPLICATION

This application claims the benefit of U.S. Provisional Application No. 60/327,238, filed Oct. 5, 2001.

FIELD OF THE INVENTION

The present invention is directed to emulsion polymers, especially acrylic polymers useful as coatings and adhesives.

BACKGROUND OF THE INVENTION

Acrylic polymers are well known and are commonly used to produce adhesives, including PSA tapes, labels, and other constructions. They are also used as, or in, a variety of coatings, including paints, primers, barrier layers, scratch-resistant hard coatings, ink-receptive coatings, and chemical-resistant coatings. They can be prepared by a variety of polymerization processes, including bulk, solvent, and emulsion polymerization. In emulsion polymerization, a number of monomers are dispersed in a continuous aqueous phase with the aid of one or more emulsifiers (surfactants) and polymerization is catalyzed by, e.g., a free-radical initiator. The resulting product, a colloidal dispersion of polymer particles, is called a latex, an emulsion polymer, or simply, an emulsion. Particle size and molecular weight are typically distributed across a range of values, which can be expressed using statistical means.

In the production of PSA tapes and labels, it is desirable to employ relatively high solids content polymers. Because less water is present in high solids content emulsion polymers, several distinct cost-savings can be realized. More material can be formed in a given production cycle; transportation costs are reduced; and faster line speeds can be employed as less water needs to be removed when the polymer coating is dried. At the same time, however, the viscosity of an emulsion polymer typically increases as the polymer's solids content is increased. If the viscosity is too high, coatability and processing becomes more difficult. Paste-like emulsions, for example, cannot be coated with Meyer rod and similar coaters traditionally used in the production of PSA tapes, labels, and other constructions. In general, the solids content of emulsion polymers used in the PSA industry is rarely higher than about 67% by weight. A need exists for inherently tacky, emulsion polymers having both high solids content for economy and low viscosity for processability.

PSAs are used in a wide variety of applications, at different temperatures and environmental conditions. A given PSA may perform (adhere) well when applied to a given substrate, or at a particular temperature, yet be wholly unsuitable for other substrates and use temperatures. Particularly problematic are low temperature (<0° C.) applications. In order to achieve even a nominal degree of adhesion, it is usually necessary to lower the glass transition temperature of the PSA polymer well below the use temperature of the adhesive, the temperature at which the PSA tape, label or other construction is applied to a substrate or put to use. However, not all low-$T_g$ emulsion polymers are suitable for use as PSAs at low temperatures. It is not uncommon for low-$T_g$ polymers to have undesirably high creep values, making converting (slitting, die-cutting, matrix stripping, and so forth) problematic. A need exists for improved emulsion polymers that function as PSAs when applied to a variety of substrates even at low temperatures.

SUMMARY OF THE INVENTION

It has now been discovered that acrylic emulsion polymers characterized by both high solids content and low viscosity can be prepared using a blend of surfactants and a split monomer feed. The resulting polymers have a multi-modal (or at least bimodal) particle-size distribution.

In one embodiment of the invention, a high solids content, low-viscosity emulsion comprises an emulsified product of copolymerizing a plurality of monomers in the presence of a plurality of surfactants, wherein the plurality of monomers comprises, on a percent-by-weight basis, based on the total weight of monomers, about 90–98% alkyl acrylate(s) having an alkyl group containing from 4 to 12 carbon atoms; about 0.1 to 0.5% N-vinyl pyrrolidone; about 0.5 to 4.5% ethylenically unsaturated carboxylic acid(s); and 0 to about 0.5% (more preferably, about 0.1 to 0.5%) multifunctional crosslinking monomer(s); wherein the sum of all monomer weight percentages is 100%. The emulsified product has at least a bimodal particle-size distribution and a solids content of at least 68% by weight, yet, nevertheless, is pourable, with a viscosity of from about 300 to 15,000 centipoise (cps). In some embodiments, the plurality of monomers may also contain a minor amount of methyl or ethyl acrylate, e.g., up to about 6% by weight, based on the total weight of all monomers. Minor amounts of other monomers commonly used to prepare PSA polymers may also be employed.

Emulsion polymers according to the present invention are prepared in a straightforward manner. In one embodiment, the emulsified product is formed sequentially by polymerizing (a) a pre-emulsified first portion of the plurality of monomers, which is fed into a reactor in two distinct feeds, wherein a first feed is relatively slow and contains about 0.4% to 1% by weight of the pre-emulsified first portion of the plurality of monomers, and a second feed is relatively fast and contains about 99 to 99.6% by weight of the pre-emulsified first portion of the plurality of monomers; and (b) a second portion of the plurality of monomers. The second portion of the plurality monomers can be, but does not need to be, pre-emulsified before it is fed into the reactor and polymerized.

In an alternate embodiment, the emulsified product is formed by polymerizing a single pre-emulsion of the plurality of monomers, which is introduced into the reactor in two distinct feeds, wherein a first feed is relatively slow and a second feed is relatively fast, and the first and second feeds contain, preferably, the relative weight percentages stated above.

Preferably, the surfactant system consists of three anionic surfactants, each having a particular primary function, i.e., particle generation, emulsion stabilization, and wet-out/coating enhancement.

DETAILED DESCRIPTION OF THE INVENTION

According to a preferred embodiment of the invention, a high solids content, low-viscosity emulsion is provided and comprises an emulsified product of copolymerizing a plurality of monomers in the presence of a plurality of surfactants, wherein the plurality of monomers comprises, on a percent by weight basis, based on the total weight of monomers, about 90 to 98% alkyl acrylate(s) having an alkyl group containing from 4 to 12 carbon atoms; about 0.1 to 0.5% N-vinyl pyrrolidone; about 0.5 to 4.5% ethylenically unsaturated carboxylic acid(s); and 0 to about 0.5% (more preferably, 0.01 to 0.5%) multifunctional crosslinking monomer(s). Optionally, the plurality of monomers contains a positive amount up to about 6% by weight of methyl acrylate or ethyl acrylate. The emulsified product of polymerization has at least a bimodal, more preferably a multimodal, particle-size distribution.

Nonlimiting examples of alkyl acrylates having 4 to 12 carbon atoms in the alkyl group thereof include butyl, pentyl, hexyl, heptyl, octyl, iso-octyl, ethylhexyl, nonyl, decyl, and dodecyl acrylate. As between 2-ethylhexyl acrylate, butyl acrylate, and iso-octyl acrylate (three commodity acrylates commonly used to make PSA acrylic polymers), 2-ethylhexyl acrylate is preferred, because copolymers based on 2-ethylhexyl acrylate have a lower $T_g$ than copolymers whose main component is butyl acrylate. Iso-octyl acrylate is less preferred, because emulsion polymers based on iso-octyl acrylate appear to be less stable than polymers based on 2-ethylhexyl acrylate.

Nonlimiting examples of ethylenically unsaturated carboxylic acids include acrylic acid, methacrylic acid, beta-carboxyethyl acrylate, and itaconic acid. A mixture of acrylic acid and methacrylic acid is preferred.

As used herein, the term "multifunctional crosslinking monomer" means a monomer which is copolymerizable with acrylic monomers and which as at least one carbon-carbon double bond and at least one other functional group capable of entering into a polymerization or crosslinking reaction. Nonlimiting examples of such monomers include multifunctional (meth)acrylates, e.g., diacrylates, triacrylates, dimethyacrylates, and trimethylacrylates; multifunctional allylic compounds, e.g., diallyl maleate and allyl methacrylate; multifunctional crosslinking monomers having a vinyl group; and multifunctional crosslinking monomers having a reactive hereroatom-containing functional group such as the imidazolidone group. A nonlimiting list includes the following:

| Multifunctional Monomer | Abbreviation |
|---|---|
| Allyl Methacrylate | AMA |
| Diallyl Maleate | DAM |
| Divinyl Benzene | DVB |
| Ethylene Glycol Dimethacrylate | EGDMA |
| N,N'-methylene-bis-acrylamide | NNMBA |
| Tripropylene Glycol Diacrylate | TPGDA |
| Triallyl Cyanurate | TAC |
| Tetraethylne Glycol Diacrylate | TEGDA |
| Triethylene Glycol Dimethacrylate | TEDMA, TEGMA |
| Trimethylolpropane Triacrylate | TMPTA |
| Trimethylolpropane Trimethacrylate | TMPTMA, TRIM |
| Trimethylolpropane Diallyl Ether | TMPDAE |
| Imidazolidone Methacrylate | MEIO |

A preferred multifunctional crosslinking monomer is Norsocryl® 104 (from Elf Atochem), a 35–37% by weight solution of ethyl imidazolidone methacrylate (MEIO) in methyl methacrylate. Both MEIO and the methyl methacrylate copolymerize with the other monomers present in the monomer mix; thus, methyl methacrylate is considered one of the "plurality of monomers" in embodiments containing Norsocryl® 104. Alternatively, the MEIO is dissolved in a different solvent, preferably a reactive (copolymerizable) diluent, for example, short chain alkyl (meth)acrylates like methyl, ethyl, or propyl (meth)acrylate.

The multifunctional crosslinking monomer improves shear performance (enhanced cohesive strength) of the resulting emulsion polymer. If too much crosslinking monomer is used, however, the adhesive performance (e.g., looptack) is substantially diminished. It is particularly advantageous to include the multifunctional crosslinking monomer in low-temperature PSA formulations. By doing so, one can obtain good shear strength at low temperature, without loss of tack.

Optionally, the plurality of monomers includes a minor amount of methyl and/or ethyl acrylate, e.g., a positive amount up to about 6%, more preferably about 0.2 to 0.5% by weight, based on the weight of all monomers. Including methyl or ethyl acrylate appears to speed-up the overall polymerization rate and decrease the amount of residual monomers (unreacted monomers present after polymerization has ended). In some embodiments, the plurality of monomers also includes a minor amount of one or more other copolymerizable monomers commonly employed in the preparation of PSA polymers. Nonlimiting examples include vinyl acetate, styrene, and diesters of ethylenically unsaturated carboxylic acids, e.g., dioctyl maleate and dioctyl fumarate. If included, the other monomer(s) are each present in no more than about 15% by weight, based on the total weight of monomers, with a corresponding reduction in the amount of alkyl acrylate(s) employed. Where the resulting polymer is to be used as a PSA, the weight percent of any additional monomer(s) is further constrained by the desired $T_g$ of the resulting polymer, which, in general, should be at least 25° C. below the lowest expected use temperature of the adhesive.

The small amount of N-vinyl pyrrolidone (NVP) in the monomer mixture is not critical for achieving pressure-sensitive adhesive properties, but appears to yield more stable emulsion polymers and may contribute to low viscosity. Goods results are achieved when the NVP is present in an amount of about 0.1 to 0.5%, more preferably about 0.2 to 0.3%. Above 0.5%, particle-size distribution and viscosity may suffer.

It is preferred to use a plurality of surfactants in the course of polymerizing the monomers, with anionic surfactants being most preferred. In particular, a mixture of three different surfactants, each with a primary function, provides very good results. A first surfactant has a primary function of emulsion polymer particle generation, and is present in an amount of about 10 to 20% by weight, based on the total weight of surfactants. A second surfactant has the primary function of emulsion stabilization, and is present in an amount of from about 20 to 30% by weight. A third surfactant has a primary function of enhancing substrate wet-out and/or emulsion coatability, and is present in an amount of about 55 to 65%. The sum of all surfactants, of course, is 100%.

The first type of surfactant is preferably a sulfate of an ethoxylated alcohol, e.g., a sodium lauryl ether sulfate. A nonlimiting example is Disponil FES 77, from Henkel Corp.

The second type of surfactant is preferably a sulfosuccinate or derivative, e.g., a disodium ethoxylated alcohol half ester of sulfosuccinic acid. A nonlimiting example is Aerosol A-102, from Cytec Industries, Inc.

The third type of surfactant is preferably a sulfosuccinate or derivative, e.g., a dioctyl ester of sodium sulfosuccinic acid. A nonlimiting example is Aerosol OT-75, also from Cytec Industries, Inc.

In addition to the monomers and surfactants described above, additional ingredients, reagents, processing aids, and other components are used in preparing preferred embodiments of the invention. A nonlimiting list includes polymerization catalysts (initiators), for example, potassium persulfate ($K_2S_2O_8$); electrolytes, e.g., tetrasodium pyrophosphate (TSPP—an electrolyte used to control emulsion stability and particle-size), and other sodium or potassium salts; chain transfer agents, for example, n-dodecyl mercaptan (n-DDM); base solutions; (e.g., aqueous ammonia sodium hydroxide, etc.); accelerators, e.g., sodium formaldehyde sulfoxylate (AWC—used to decompose excess initiator); defoaming agents, for example, Drewplus L-191; biocides, for example, Kathon LX; and water or other emulsion media (the continuous phase), e.g., a mixture of water and lower alcohol(s).

Emulsion polymers according to the present invention are prepared in a straightforward manner. In one embodiment, a pre-emulsified first portion of the monomers is fed into a reactor and polymerized in two distinct feeds, followed by a second portion of monomers, which may or may not be pre-emulsified. Thus, in one embodiment, a portion of the monomers is dispersed in aqueous media with one or more surfactants, and the resulting pre-emulsion is fed into the reactor beginning with a slow feed of a very small initial quantity of the pre-emulsion, e.g., up to about 2% by weight, more preferably from about 0.4 to 1% by weight of the pre-emulsified first portion of the plurality of monomers, followed by a fast second feed containing from about 99 to 99.6% by weight of the pre-emulsified first portion of the plurality of monomers. Thereafter, a second portion of the monomers is fed into the reactor. It has been found that ideal results (high solids content and low viscosity) are obtained when the second feed rate is at least about five times faster than the first feed rate. In some embodiments, the second feed rate is as much as 10 or even 20 times that of the first feed rate.

In an alternate embodiment, the entire plurality of monomers is pre-emulsified and then fed into the reactor as a split feed, with a first feed containing a very small amount, e.g., up to about 2%, more preferably from about 0.4 to 1% by weight, of the pre-emulsion of monomers, and the second feed containing the remainder of the monomers, e.g., from about 99 to 99.6% by weight of the pre-emulsion. As above, the relative rates of feed are also quite disparate, with the second feed rate being at least about 5 times as great as the first feed rate.

It is believed that polymerization of a slow feed of a small quantity of monomers yields a minor amount of very small (<300 nm) particle-size polymers, as evidenced by a slight blueish (opalescent) tint of the reaction mixture. Subsequent monomer feed, at a faster rate and higher concentration, is thought to yield larger (300–700 nm, or >700 nm) polymer particles.

Emulsion polymers prepared according to the present invention are, in general, characterized by high molecular weights (>1,000,000), high gel content (>60 or 70% by weight), high solids content and low viscosity, and, in the case of PSA polymers, a glass transition temperature ($T_g$) at least about 25° C. below the expected use temperature of the PSA. For example, emulsion polymers for PSAs used in room temperature applications should have a $T_g$<about 0° C. For low temperature applications, it is preferred that the polymers have a $T_g$<about –50° C.

When solids content is measured immediately following polymerization, values as high as 75 to 78% by weight are seen. (In at least one embodiment, a solids content of about 82% by weight is achieved). After being neutralized and diluted with deionized water, the emulsified product has a solids content of about 70% (at a minimum, 68–69%) by weight, or higher. Despite its high solids content, the emulsified product of polymerization is a pourable material, not a paste, with a viscosity of from about 300 to 15,000 cps. The viscosity of a given polymer according to the present invention can be controlled by adjusting the choice and amount of monomers and surfactants, and by adjusting the monomer feed rate. In addition, high solids content, high viscosity emulsions can be diluted to lower the viscosity, if necessary.

The particular solids content and viscosity desired for a given emulsion polymer depends in part on the manner in which the emulsion polymer is to be coated on, or otherwise applied to, a backing or other substrate. It is known, for example, that reverse gravure, nip-fed coaters used in the preparation of PSA constructions do not work well with high viscosity materials, with 1,000 centipoise being the approximate limit of acceptable viscosity. To date, however, such low-viscosity materials have not been achievable at high solids content. As another example, die-coating techniques can handle much higher viscosity materials—as high as 10,000 cps or higher—particularly if the material being coated is thixotropic. At the high shear forces encountered at the lips of an extrusion die-coater, the viscosity of a shear-thinning emulsion polymer will be much lower than 10,000 cps.

When coated on a substrate and dried, the polymers of the present invention are inherently tacky and useful in preparing paints, primers, coatings, barrier layers, and adhesives—including pressure-sensitive adhesive tapes, labels, and other constructions. In one embodiment, a coated construction is prepared by coating the polymer emulsion on a release liner, drying the emulsion, and laminating the resulting subassembly to a facestock or other substrate, e.g., a paper or film backing. Alternatively, the emulsion is coated directly on a facestock, dried, and then protected until use by a release liner or a low release energy backsize of the construction. In another embodiment, a coated construction is prepared by simply coating the emulsion polymer on a substrate and allowing it to dry.

The following examples are nonlimiting illustrations of various embodiments of the invention.

EXAMPLE 1

Using the components listed in Table 1A, a high solids content, low-viscosity emulsion polymer was prepared as follows: A polymerization reactor was charged with an initial "reactor charge," except for the kick-off catalyst, and heated to 76° C. Agitation was set at 120 rpm (laboratory) or 50 rpm (pilot reactor). Monomer mixes (1) and (2) and a pre-emulsion soap (surfactant) solution were prepared separately. Monomer mix (1) was added to the soap solution under agitation to form a stable monomer pre-emulsion (1) and held for delay addition. A catalyst solution was prepared and held for a delay addition. When the reactor reached 76° C., the kick-off catalyst was added and the reactor was purged with nitrogen ($N_2$) for five minutes. The nitrogen was then turned off. Pre-emulsion (1) feed was started at 1.00 g/min. for 3.8 min., followed by a second faster feed at 4.85 g/min. Twenty minutes after the beginning of the pre-emulsion feed, the catalyst feed was started at 0.20 parts by weight per min. for 207 min. Batch temperature was maintained between 78 and 86° C. Agitation was increased as necessary to ensure effective mixing. Ten minutes after pre-emulsion (1) was added to the reactor, monomer mix (2) was fed into thr reactor at 1.55 g/min. for 55 min. Thirty minutes after 90% of the catalyst delay was in, the remainder of the catalyst was fed in at 1.00 parts by weight/min. for 4.6 min. and then the batch was held at 78–85° C. for another 30 minutes. Residual monomer concentration was checked. When the residual monomer concentration was below 0.10%, cooling of the batch was commenced to 35° C. After the temperature had been reduced to 60° C., the first 19% ammonia solution and 50% AWC solution were added. When the temperature reached 35° C., the defoamer and biocide were added. The second 19% ammonia solution and deionized water were added to adjust the pH and solid/viscosity of the emulsified product, which was then filtered through a 25 or 50 micron filter. The resulting product was checked for residual monomers, pH, total solids content, and viscosity. Table 1B presents parts by weight and time (minutes) for the reaction delays. Theoretical solids were 67.62%.

TABLE 1A

Example 1

| Component | Mass (g) | |
|---|---|---|
| Reactor Charge | | |
| Deionized Water | 108.35 | |
| FES 77 (32.50%) | 0.15 | |
| $K_2S_2O_8$ ("kick-off" catalyst) | 1.50 | |
| | 110.00 | |
| Pre-emulsion Soap Solution | | |
| Deionized Water | 86.00 | |
| TSPP (59.70%) | 2.60 | |
| OT-75 (75.00%) | 2.20 | |
| A-102 (31.50%) | 7.70 | |
| FES-77 (32.50%) | 18.30 | |
| | 116.80 | |
| Monomer Mix | (1) | (2) |
| 2-EHA | 525.50 | 81.30 |
| MA | 2.70 | 1.30 |
| NVP | 2.80 | 0.00 |
| MAA | 7.10 | 1.80 |
| AA | 2.90 | 0.00 |
| Norsocryl 104 | 2.50 | 0.50 |
| n-DDM | 0.30 | 0.10 |
| | 543.80 | 85.00 |
| Catalyst Solution for Delay | | |
| Deionized Water | 44.30 | |
| $K_2S_2O_8$ | 1.70 | |
| | 46.00 | |
| Miscellaneous | | |
| 1st $NH_3$ Solution (19%) | 3.50 | |
| 50% AWC Solution | 0.30 | |
| Drewplus L-191 | 0.30 | |
| Kathon LX (1.50%) | 0.30 | |
| 2nd $NH_3$ Solution (19%) | 1.00 | |
| Deionized Water | 13.00 | |
| Grand Total | 920.00 | |

Solids Content: 69.9 ± 0.5%

TABLE 1B

Delay Addition

| Component | Amount (g) | Time (min.) | Rate (g/min.) |
|---|---|---|---|
| Pre-em (1) | | | |
| Initial | 3.80 | 3.80 | 1.00 |
| Remainder | 656.80 | 135.00 | 4.85 |
| Catalyst | | | |
| Initial | 41.40 | 207.00 | 0.20 |
| Remainder | 4.60 | 4.60 | 1.00 |
| Monomers (2) | 85.00 | 55.00 | 1.55 |

The emulsion polymer of Example 1 had a pH of 6.8 to 7.5; measured grit of less than 80 ppm on a 55 micron filter; residual monomers of less than 0.10%; and a viscosity of 1,000 to 5,000 cps, using a Brookfield LVT viscometer (#3 spindle), at 30 rpm and 25° C. The extremely low grit level is an extra advantage of the present invention. In contrast, many commercial polymerizations yield grit levels exceeding 1,000 ppm. When coated, such high grit compositions tend to have striations and a streaked appearance.

EXAMPLE 2

A high solids content, low-viscosity emulsion polymer is prepared according to Example 1, except a single monomer mixture is used ((1)+(2)) to prepare a pre-emulsion, which is then fed into a reactor as a split feed, with the first feed containing about 0.60% by weight of the monomer pre-emulsion, at a rate of about 1.00 g/min., and the second feed containing about 99.4% by weight of the monomer pre-emulsion, at a rate of about 4.85 g/min.

A number of PSA constructions were prepared and tested for adhesive performance on low density polyethylene (LDPE) and corrugated cardboard. An emulsion polymer prepared according to the present invention was coated on a siliconized release liner, dried in an oven for ten minutes at 75° C., and laminated to a 60 lb/ream high gloss paper facestock. Adhesive coat weight was 20±1 lg/m² measured after drying. The PSA constructions were tested and compared to a commercial product, Flexcryl ATA, an acrylic emulsion polymer from Air Products and Chemical, Inc., Polymer Chemicals Division. The constructions were tested for 90° peel, looptack, T-peel, and shear strength. The "cold box" test, a looptack test conducted in an environmental chamber at three temperatures (−5, −20, and −35° C.) was carried out on an HDPE substrate. The T-peel test is a self-adhesion test designed to indicate performance in an airline luggage tag application.

Despite some variability in the test results, particularly at low temperatures (presumably due to condensation forming on the substrate), it is clear that PSAs prepared using the emulsion polymers described herein exhibited adhesive performance comparable to that of the commercially available Flexcryl product. In some tests, at certain temperatures, superior performance was observed.

The invention has been described by preferred and exemplary embodiments, but is not limited thereto. Persons skilled in the art will understand that other modifications can be made to the emulsions, methods, and PSA constructions according to the invention, without departing from the scope of the invention. For example, tackifiers and/or plasticizers can be added to adjust PSA performance and utility. A tackifier tends to increase the glass transition temperature and lower the modulus of the polymer to which it is added. Adding a tackifier can broaden the range of temperatures over which the emulsion polymers can be used. In addition, many tackifying resins are 50–60% by weight solids. Adding such a tackifier to a high solids content polymer will reduce the overall solids content of the composition. For example, adding 40 parts by weight of a 55% solids content tackifier to 60 parts by weight of a 65% solids content emulsion will yield a final product with an overall solids content of 61% by weight. If one starts with a 75% solids content emulsion polymer, the resulting composition will have a solids content of 67% by weight. Consequently, one can start with a high solids content, low-viscosity polymer having a higher-than-desired $T_g$, add a tackifier (thereby lowering the $T_g$ of the overall composition), and obtain a tackified composition having the desired solids content, viscosity, and $T_g$ for a given application.

It will also be apparent that the method of emulsion polymerization according to the present invention has a general utility extending beyond the particular monomer systems described herein. The slow initial monomer feed (0.4 to about 1% by weight of the monomers) followed by a fast second monomer feed (99 to about 99.6% by weight of the monomers) yields particle-size distributions that are multimodal, or at least bimodal.

It is contemplated that other monomers, acrylic and otherwise, can be polymerized in emulsion according to this method, preferably, but not necessarily, with a plurality of surfactants. At present, anionic surfactants are preferred.

Throughout the text and the claims, use of the word "about" in relation to a range of numbers is intended to modify both the low and high values recited.

What is claimed is:

1. A high solids content, low-viscosity emulsion, comprising:
an emulsified product of copolymerizing a plurality of monomers in the presence of a plurality of surfactants, wherein the plurality of monomers comprises, on a percent by weight basis, based on the total weight of monomers, about 90 to 98% alkyl acrylate(s) having an alkyl group containing from 4 to 12 carbon atoms; about 0.1 to 0.5% N-vinyl pyrrolidone; about 0.5 to 4.5% ethylenically unsaturated carboxylic acid(s); and 0 to about 0.5% multifunctional crosslinking monomer(s); wherein the emulsified product has at least a bimodal particle-size distribution, a solids content of at least 68% by weight, and a viscosity of from 300 to 15,000 cps.

2. A high solids content, low-viscosity emulsion as recited in claim 1, wherein the emulsified product has a multimodal particle-size distribution.

3. A high solids content, low-viscosity emulsion as recited in claim 1, wherein the plurality of monomers further comprises methyl acrylate and/or ethyl acrylate in a positive amount up to about 6% by weight, based on the total weight of monomers.

4. A high solids content, low-viscosity emulsion as recited in claim 1, wherein the alkyl acrylate(s) is selected from the group consisting of ethylhexyl acrylate, butyl acrylate, and mixtures thereof.

5. A high solids content, low-viscosity emulsion as recited in claim 1, wherein the alkyl acrylate(s) comprises ethylhexyl acrylate.

6. A high solids content, low-viscosity emulsion as recited in claim 1, wherein the ethylenically unsaturated carboxylic acid(s) is selected from the group consisting of acrylic acid, methacrylic acid, beta-carboxyethyl acrylate, itaconic acid, and mixtures thereof.

7. A high solids content, low-viscosity emulsion as recited in claim 1, wherein the ethylenically unsaturated carboxylic acid(s) comprises a mixture of acrylic acid and methacrylic acid.

8. A high solids content, low-viscosity emulsion as recited in claim 1, wherein the multifunctional crosslinking monomer(s) is selected from the group consisting of multifunctional (meth)acrylates, multifunctional alylic compounds, multifunctional crosslinking monomers having a vinyl group; and multifunctional crosslinking monomers having a reactive heteroatom-containing functional group.

9. A high solids content, low-viscosity emulsion as recited in claim 1, wherein the multifunctional crosslinking monomer comprises ethyl imidazolidone methacrylate.

10. A high solids content, low-viscosity emulsion as recited in claim 9, wherein the ethyl imidazolidone methacrylate is dissolved in a solvent.

11. A high solids content, low-viscosity emulsion as recited in claim 10, wherein the solvent comprises a reactive diluent.

12. A high solids content, low-viscosity emulsion as recited in claim 11, wherein the reactive diluent comprises a short-chain alkyl (meth)acrylate.

13. A high solids content, low-viscosity emulsion as recited in claim 1, wherein the plurality of monomers comprises about 90 to 98% ethylhexyl acrylate, about 0.1 to 0.5% N-vinyl pyrrolidone, about 0.5 to 4.5% of a mixture of acrylic acid and methacrylic acid, about 0.1 to 0.5% of ethyl imidazolidone methacrylate in methyl methacrylate; and a positive amount up to about 6% by weight of methyl acrylate and/or ethyl acrylate.

14. A high solids content, low-viscosity emulsion as recited in claim 1, wherein the plurality of monomers further comprises one or more of vinyl acetate, styrene, and a diester of an ethylenically unsaturated carboxylic acid.

15. A high solids content, low-viscosity emulsion as recited in claim 1, wherein the emulsified product is formed sequentially by polymerizing (a) a pre-emulsified first portion of the plurality of monomers, which is fed into a reactor in two distinct feeds, wherein a first feed is relatively slow and contains about 0.4% to 1% by weight of the pre-emulsified first portion of the plurality of monomers, and a second feed is relatively fast and contains about 99 to 99.6% by weight of the pre-emulsified first portion of the plurality of monomers; and (b) a second portion of the plurality of monomers.

16. A high solids content, low-viscosity emulsion as recited in claim 1, wherein the emulsified product is formed by polymerizing a pre-emulsion of the plurality of monomers as the pre-emulsion is fed into a reactor in two distinct feeds, wherein a first feed is relatively slow and contains about 0.4% to 1% by weight of the plurality of monomers, and a second feed is relatively fast and contains about 99 to 99.6% by weight of the plurality of monomers.

17. A high solids content, low-viscosity emulsion as recited in claim 1, wherein the plurality of surfactants comprises, on a percent by weight basis, based on the total weight of surfactants, about 10 to 20% of a first surfactant, whose primary function is particle generation; about 20 to 30% of a second surfactant, whose primary function is emulsion stabilization; and about 55 to 65% of a third surfactant, whose primary function is substrate wet out and/or emulsion coatability.

18. A high solids content, low-viscosity emulsion as recited in claim 17, wherein the first surfactant comprises an ethoxylated lauryl alcohol, long fatty acid.

19. A high solids content, low-viscosity emulsion as recited in claim 17, wherein the second surfactant comprises a half-ester of succinic acid.

20. A high solids content, low-viscosity emulsion as recited in claim 17, wherein the third surfactant comprises succinic sulfonic acid.

21. A high solids content, low-viscosity emulsion as recited in claim 1, wherein the plurality of surfactants comprises an ethoxylated lauryl alcohol, long fatty acid; a half-ester of succinic acid; and succinic sulfonic acid.

22. A high solids content, low-viscosity emulsion, comprising:
an emulsified product of copolymerizing a plurality of monomers in the presence of a plurality of surfactants, wherein the plurality of monomers comprises, on a percent by weight basis, based on the total weight of monomers, about 90 to 98% alkyl acrylate(s) having an alkyl group containing from 4 to 12 carbon atoms; about 0.1 to 0.5% N-vinyl pyrrolidone; about 0.5 to 4.5% ethylenically unsaturated carboxylic acid(s); and 0 to about 0.5% multifunctional crosslinking monomer(s); and the emulsified product is formed sequentially by polymerizing (a) a pre-emulsified first portion of the plurality of monomers, which is fed into a reactor in two distinct feeds, wherein a first feed contains about 0.4% to 1% by weight of the pre-emulsified first portion of the plurality of monomers and is metered into the reactor at a relatively slow first feed rate, and the second feed contains about 99 to 99.6% by weight of the pre-emulsified first portion of the plurality of monomers and is metered into the reactor at a relatively fast second feed rate; and (b) a second portion of the plurality of monomers.

23. A high solids content, low-viscosity emulsion as recited in claim 22, wherein the second feed rate is at least about five times faster than the first feed rate.

24. A coated construction formed by (a) depositing on a substrate a high solids content, low-viscosity emulsion as recited in claim 1, and (b) drying the emulsion.

25. A coated construction as recited in claim 24, wherein the emulsion is deposited on a substrate, dried, and then protected with a release liner.

26. A coated construction as recited in claim 24, wherein the emulsion is deposited on a release liner and dried, thereby forming a subassembly, and the subassembly is then laminated a substrate.

27. A coated construction as recited in claim 24, wherein the substrate is a paper or film.

28. A coated construction as recited in claim 27, wherein the substrate is die-cut.

29. A coated construction as recited in claim 24, wherein the construction is a PSA tape or label.

30. A method for making a high solids content, low-viscosity emulsion polymer, comprising:

copolymerizing a plurality of monomers in the presence of a plurality of surfactants, the plurality of copolymers comprising, on a percent by weight basis, based on the total weight of monomers, about 90 to 98% alkyl acrylate(s) having an alkyl group containing from 4 to 12 carbon atoms; about 0.1 to 0.5% N-vinyl pyrrolidone; about 0.5 to 4.5% ethylenically unsaturated carboxylic acid(s); and 0 to about 0.5% multifunctional crosslinking monomer(s); wherein (a) a pre-emulsified first portion of the plurality of monomers is fed into a reactor in two distinct feeds and allowed to polymerize, in which a first feed contains about 0.4% to 1% by weight of the first portion of the plurality of monomers and is metered into the reactor at a relatively slow first feed rate, and a second feed contains about 99 to 99.6% by weight of the first portion of the plurality of monomers and is metered into the reactor at a relatively fast feed rate; and (b) polymerization continues as a second portion of the plurality of monomers is fed into the reactor.

31. A method as recited in claim 30, wherein the second feed rate is at least about five times faster than the first feed rate.

32. A method for making a high solids content, low-viscosity emulsion polymer, comprising:

copolymerizing a plurality of monomers in the presence of a plurality of surfactants, the plurality of copolymers comprising, on a percent by weight basis, based on the total weight of monomers, about 90 to 98% alkyl acrylate(s) having an alkyl group containing from 4 to 12 carbon atoms; about 0.1 to 0.5% N-vinyl pyrrolidone; about 0.5 to 4.5% ethylenically unsaturated carboxylic acid(s); and 0 to about 0.5% multifunctional crosslinking monomer(s); wherein polymerization occurs as a pre-emulsion of the plurality of monomers is fed into a reactor in two distinct feeds, in which a first feed contains about 0.4% to 1% by weight of the plurality of monomers and is metered into the reactor at a relatively slow first feed rate, and a second feed contains about 99 to 99.6% by weight of the plurality of monomers and is metered into the reactor at a relatively fast feed rate.

33. A high solids content, low-viscosity emulsion, comprising:

the emulsified product of copolymerizing a plurality of monomers in the presence of a plurality of surfactants, wherein the plurality of monomers comprises, on a percent by weight basis, based on the total weight of monomers, about 96.5% ethylhexyl acrylate; about 0.6% methyl acrylate; about 0.5% N-vinyl pyrrolidone; about 1.4% methacrylic acid; about 0.5% acrylic acid; and about 0.18% imidazolidone methacrylate; and about 0.32% methyl methacrylate; wherein the emulsified product has at least a bimodal particle-size distribution.

34. A high solids content, low-viscosity emulsion as recited in claim 33, wherein the emulsified product has a multimodal particle-size distribution.

35. A high solids content, low-viscosity emulsion as recited in claim 33, wherein the emulsified product is formed sequentially by polymerizing (a) a pre-emulsified first portion of the plurality of monomers, which is fed into a reactor in two distinct feeds, wherein a first feed is relatively slow and contains about 0.4% to 1% by weight of the pre-emulsified first portion of the plurality of monomers, and a second feed is relatively fast and contains about 99 to 99.6% by weight of the pre-emulsified first portion of the plurality of monomers; and (b) a second portion of the plurality of monomers.

36. A high solids content, low-viscosity emulsion as recited in claim 33, wherein the emulsified product is formed by polymerizing a pre-emulsion of the plurality of monomers as the pre-emulsion is fed into a reactor in two distinct feeds, wherein a first feed is relatively slow and contains about 0.4% to 1% by weight of the plurality of monomers, and a second feed is relatively fast and contains about 99 to 99.6% by weight of the plurality of monomers.

37. A high solids content, low-viscosity emulsion as recited in claim 1 or claim 22, further comprising a tackifier, plasticizer, or both a tackifier and a plasticizer.

38. A high solids content, low-viscosity emulsion as recited in claim 22 further comprising a tackifier, a plasticizer, or both a tackifier and a plasticizer.

39. A coated construction formed by (a) depositing on a substrate a high solids content, low viscosity emulsion as recited in claim 22 and (b) drying the emulsion.

* * * * *

UNITED STATES PATENT AND TRADEMARK OFFICE
CERTIFICATE OF CORRECTION

PATENT NO. : 6,706,356 B2
DATED : March 16, 2004
INVENTOR(S) : Lee

It is certified that error appears in the above-identified patent and that said Letters Patent is hereby corrected as shown below:

<u>Column 9,</u>
Line 47, delete "alylic", insert -- allylic --

Signed and Sealed this

Twenty-eighth Day of June, 2005

JON W. DUDAS
*Director of the United States Patent and Trademark Office*